United States Patent [19]

Turi

[11] Patent Number: 5,607,172
[45] Date of Patent: Mar. 4, 1997

[54] EXTENDED BICYCLE FRAME IN COMBINATION WITH A HARNESS APPARATUS

[76] Inventor: John J. Turi, 247 Elm Rd., Princeton, N.J. 08540

[21] Appl. No.: 561,698

[22] Filed: Nov. 22, 1995

[51] Int. Cl.$^6$ .................................................. B62J 39/00
[52] U.S. Cl. ............................................ 280/290; 280/274
[58] Field of Search ................................... 280/290, 288.4, 280/274, 281.1

[56] References Cited

U.S. PATENT DOCUMENTS

| | | | |
|---|---|---|---|
| 579,002 | 3/1897 | Merrill | 280/290 |
| 601,530 | 3/1898 | Singleton | 280/290 |
| 602,609 | 4/1898 | Tatro | 280/290 |
| 626,736 | 6/1899 | Taulbee et al. | 280/290 |
| 635,683 | 10/1899 | Herman | 280/290 |
| 636,108 | 10/1899 | Blackman | 280/290 |
| 638,861 | 12/1899 | Bean | 280/290 |
| 742,800 | 10/1903 | Patten | 280/290 |
| 2,229,778 | 1/1941 | Taulbee | 280/290 |

FOREIGN PATENT DOCUMENTS

| | | | |
|---|---|---|---|
| 105212 | 2/1938 | Australia | 280/290 |
| 210175 | 5/1955 | Australia | 280/290 |
| 472616 | 8/1914 | France | 280/290 |
| 796482 | 4/1936 | France | 280/290 |
| 879302 | 2/1943 | France | 280/290 |
| 410538 | 4/1945 | Italy | 280/290 |
| 12436 | 2/1889 | United Kingdom | 280/290 |
| 10279 | 9/1895 | United Kingdom | 280/290 |
| 23722 | 10/1895 | United Kingdom | 280/290 |
| 234246 | 5/1925 | United Kingdom | 280/290 |

Primary Examiner—Kevin Hurley
Attorney, Agent, or Firm—John J. Turi

[57] ABSTRACT

An extended bicycle frame (FIG. 2), (FIG. 3), (FIG. 4) and (FIG. 6) utilizing a top tube extended directly or at an angle rearward (12) from a forward top tube (10) at an intersection of a seat post (16) to a rear fork (14) connected downward to an axle (40) in combination with a harness apparatus (62) with front and rear male connectors (26) securable to forward (10) and rearward top tube (12) movable female connectors (24) providing a cyclist with a point of resistance at the shoulders or upper body (32) including a rotational/elevational handlebar (34). A cyclist, by either standing (FIG. 4 ) or leaning forward in various degrees (FIG. 2) (FIG. 3) is capable of efficiently implementing Newton's Law of Physics, For every action there is an equal and opposite reaction. An extended bicycle frame in combination with a harness apparatus, provides a means for a cyclist to exert a maximum force of his legs to said point of resistance (32) and directly translate said maximum force in an equal and opposite direction to the pedals (36) with a minimum of effort and discomfort. In previous art, a cyclist, without a harness contraption, on a normal bicycle (FIG. 1), (FIG. 5) in a usual position (FIG. 1) was limited to said weight of a cyclist plus the strength of his arms, elbows, wrists and hands in directing a force to said pedals. When prior art utilized a harness contraption on a normal bicycle, a cyclist in the usual position, exerted such extreme force vectors to the lower back area (42) as to present a real danger of injury, thereby limiting the time and distance he could travel comfortably. The capability of exerting a maximum force by means of said extended bicycle frame (FIG. 6) in combination with a harness apparatus (62) allows a cyclist the option of utilizing an enlarged sprocket (FIG. 8), with or without a deraileur (60), for even greater power and speed without additional effort and minimal force directed to the lower back (42).

4 Claims, 5 Drawing Sheets

EXTENDED BICYCLE FRAME IN COMBINATION WITH A HARNESS APPARATUS

BACKGROUND

Field of Invention

This invention relates to bicycle frames, specifically to extended bicycle frames in combination with a harness apparatus, providing the means to produce the most efficient application of Newton's Law, that is, "for every action, there is an equal and opposite reaction."

Traditionally, bicycles, in combination with a harness contraption, utilized a normal bicycle with the cyclist in the usual position of legs perpendicular to the ground while the upper torso was roughly horizontal to the riding surface. With this normal bicycle and a cyclist in the usual position, any force that could be generated to the pedals was limited by the weight of the cyclist and the strength of his arms, wrists and elbows in applying pressure to the handlebars in an effort to counter the upward force exerted by the cyclists' legs. From the inception of the bicycle, the position of the cyclist has been awkward and inefficient resulting in a substantial loss of force directed to the pedals.

Various prior art adopted numerous versions of harness contraptions in an attempt to create a point of resistance in order for a cyclist to generate a force that could be efficiently translated to the pedals. It was physically impossible, however, for the prior art, utilizing a harness contraption on a normal bicycle with the cyclist in the usual position, to efficiently generate a maximum force from a cyclist's legs in a direct line to a point of resistance at the shoulders and thence translate that maximum force in an equal and opposite direction to the pedals without creating dangerous stress points at the lower lumbar region of the spine and at the shoulders, arms, elbows, wrists and hands.

The deficiency the previous art attempted to overcome was: how a cyclist could generate a maximum force through his legs, over and above his weight and arm strength, to a point of resistance at the waist, shoulders or upper body, and thence translate that maximum force in an equal and opposite direction directly to the pedals.

Additionally, the previous art harness or restraint contraptions provided no means of rewinding the straps for comfort or safety. If a previous art cyclist sat down, the straps would sag dangerously into the wheels, chain or legs. A cyclist was restricted to a solitary position as long as he was in the restraint or he could attempt a dangerous maneuver by adjusting the harness while moving.

Furthermore, previous art could not generate enough power to efficiently utilize large sprockets to produce greater speed and more efficient cyling over greater distances with less fatigue.

There is, therefore, a need for an extended bicycle frame in combination with a harness apparatus with the means of producing a maximum force which can be directed to a point of resistance at the waist, shoulders or upper body and thence directly translated in an equal and opposite direction to the pedals without additional stress forces clashing at the lumbar region of the spine or at the arm, elbow, wrist and hand, thereby resulting in greater speed, ease of operation and less fatigue.

BACKGROUND

Discussion of Prior Art

Ever since the inception of the bicycle more than a century ago, the prior art has failed to resolve the major deficiency of bicycles as to how to efficiently implement Newton's Law; For every action there is an equal and opposite reaction.

Contrary to all the claims of the myriad variations of harness contraptions in combination with normal bicycle frames, the foremost deficiency of the art remained unsolved: "How to generate a maximum force upon the pedals of a bicycle over and above the weight of the cyclist's body and the strength of his arms upon the handlebar and to direct that maximum force to a point of resistance at the waist, shoulders or upper body, and thence translate that force in an equal and opposite direction to the pedals."

None have succeeded until the present invention.

The previous art approach, in attempting to solve this problem, employed various harness contraptions specifically adapted to a normal bicycle with the cyclist in a usual bent-over position with legs perpendicular to the ground and upper torso more or less horizontal to the riding surface. This prior art, however, failed to efficiently generate an equal but opposite reaction. With a harnessed cyclist locked into a bent-over position on a normal bicycle, the force vectors generated from the cyclist's legs are naturally directed to the lower lumbar region of the back, thereby increasing, not reducing, the stress at the lower back. In addition, a cyclist, in an effort to counter the force generated from lifting the body, must apply greater force by the shoulders, elbows, arms and wrists to a point of resistance at the handlebar. While a cyclist is involved with countering all these forces, he must also maintain his head in such a sight line position to see where he is going which in turn places a severe stress upon the neck muscles.

Other harness contraptions, due to their constuction and configuration, with cyclists in various positions, not only directed excessive stress at the lower lumbar region of the back but failed to create a point of resistance in which an equal and opposite force could be directly and efficiently translated to the pedals. The previous art harness, also created dangerous conditions that could seriously injure a cyclist in the event of a fall or accident, thereby negating any claimed advantage by the prior art.

The claims of the prior art are physically impossible to attain. The usual position of a cyclist on a normal bicycle defy the laws of physics by preventing a cyclist from generating a maximum force to a point of resistance at the waist, shoulders or upper body and thence directly and efficiently translating that force in an equal and opposite direction without opposing force vectors clashing at the lower lumbar region of the back as well as the arms, elbows, wrists and hands.

The present invention utilizes the least amount of muscle strength while producing the greatest efficiency, comfort and ease of operation over both long and short distances. The basic muscles used in the present invention are the leg muscles that direct a maximum force to a point of resistance at the waist, shoulders or upper body and thence directly back through the legs to the pedals. There is relatively little or no stress on the lumbar region of the back, nor on the arms, elbows, wrists and hands which do little more than steer the bicycle.

The prior art utilizing a harness contraption had no spring-tensioned straps that rewound the straps for comfort and safety when a cyclist changed positions. When a cyclist changed position, the straps would sag dangerously into the wheels, chains or legs of the cyclist requiring the cyclist to maintain a solitary position for as long as he rode the bicycle or alternatively, to attempt a hazardous adjustment while moving.

The present invention utilizes spring-tensioned straps which allow a cyclist to set the straps to the desired position and when tiring of that position, to change position and subsequently resume his original position without the danger of straps getting tangled in wheels, chain or legs of a cyclist.

Another benefit derived from the present invention is that of speed. The prior art's stress forces clashing at the lower lumbar region increased fatigue thereby curtailing cycling over longer distances. With a maximum of force efficiently translated to the pedals, a cyclist, utillizing the present invention, will be able to travel farther and faster, more comfortably and with greater ease of operation than the prior art due to a lack of stress factors at the lumbar region or on the arms, elbows, wrists and hands.

The present invention solves the above problem by introducing an extended bicycle frame of such an unusual shape and design, in combination with a harness apparatus, that provides the means for a cyclist to position himself in such a manner as to be capable of generating a maximum force directed to a point of resistance at the waist, shoulders or upper body that can be translated in a most efficient mode directly to the pedals while reducing and/or eliminating any stress at the lower lumbar region, the neck, shoulders, arms, elbows, wrists and hands of the cyclist.

A solution to this problem is needed in order for bicycles to attain a maximum degree of efficiency, comfort and ease of operation over long distances at greater speeds with less fatigue.

BACKGROUND PRIOR ART

Identification and Discussion

U.S. PATENT DOCUMENTS:

U.S. Pat. No. 638,861: John C. Bean, Dec. 12, 1899: This prior art is another variation of the strap-type harness contraption with attachments to the rear of the cycle saddle and to the handlebars. The excessive friction caused by the straps rubbing on the back and the interference with steering safety have made this prior art impractical.

U.S. Pat. No. 636,108: Frank E. Blackman, Oct. 31, 1899: This prior art is simply another version of the John C. Bean harness contraption with attachments to the saddle and handlebars. The excessive friction resulting from the straps rubbing on the back and the interference with steering safety have made this Prior Art also impractical.

U.S. Pat. No. 635,683: Anton Hennan, Oct. 24, 1899: This prior art is another variation of the above two harness contraptions with the exception that the harness is attached only to the saddle and not the handlebars. This prior art has the disadvantages of the first two without any obstruction to steerage but it also has the ill-effect of directing excessive force to the lower lombar region of the spine.

U.S. Pat. No. 579,002: Nelson Merrill, Mar. 16, 1897: This prior art is also another variation of the harness contraptions connected to the rear of the saddle. In addition to creating intolerable friction on the back, in order to increase the power directed to the pedals, the cyclist must lean forward. By leaning forward, the cyclist then places an inordinate stress upon the lower lombar region of the back. This dangerous strain upon the lower back prevents cycling for any extended time or distance.

U.S. Pat. No. 601,530: David T. Singleton: Mar. 29, 1898: This variation of a harness contraption provides two shoulder hooks attached in some manner to the frame of a bicycle. There is no spring-tensioned straps to rewind the straps when rider shifts position.

U.S. Pat. No. 626,736: Daniel Martin Taulbee, W. A. Taulbee & F. E. Sampson: Jun. 13, 1899: This is a spring-type clamped harness contraption attached to the top tube of a bicycle. This attachment has the disadvantage of putting an inordinate strain upon the shoulders of the rider pulling him forward as he pedals with the subsequent increased strain on the lower lombar region of the spine.

U.S. Pat. No. 2,229,778: D. M. Taulbee, Jan. 28, 1941: This is another shoulder-brace contraption which results not in ease of operation but distributes an inordinante force upon the lower lombar region of the spine while pedalling. The obvious safety flaws in this prior art can be readily seen by the metal bar between the rider's legs. In the event of a slip off the pedals or a fall, a serious injury can result.

FOREIGN PATENT DOCUMENTS:

210175: (8907/55) John French Austen, May 6, 1955, Australia: This is a harness contraption connected to the handlebars with the resulting intererence with steering and a rear saddle attachment with its resultant excessive friction upon the back when pedalling.

105,212: (3506/37) Edmund Burke, Sep. 19, 1938, Australia: This harness contraption is also connected to the saddle with its excessive friction upon the lower back. The rider, in utilizing this harness, must lean forward in a sitting position, which results in a greater force directed to the rider's lower lombar region of the back causing stress to that area as well as tiring the rider.

796482: (Gr. 10/Cl.5) Emile, Marcel, Robert, Pierre and Denis Bertrand, Apr. 7, 1936, France: As this art is examined in detail, it becomes obvious that it is impractical, does not do what it claims to do, specifically requires a cyclist to pedal in the usual bent-over position, claims that the prior art is operational only on a normal bicycle, requires a complicated and time-consuming operation to attach a portable rear extension and translates any additional force generated, if any, not in an equal and opposite direction but to the lower lumbar region of the spine thereby increasing, not decreasing, the severe pressures upon that area. For the reader to further comprehend this prior art, read the enclosed translation and detailed discussion thereof.

472616: MM. Guilhaumon & Loriot, Aug. 11, 1914, France: this prior art utilizes a variation of a harness contraption but like many others has the rear connection attached to the saddle producing severe frictional problems at the back area as well as increased stress directed to the lower lumbar region of the spine.

879302: Lucien Robin, Feb. 19, 1943, France: In this prior art, the harness contraption connectors attached to the saddle create an intolerable friction at the base of the back as well as directing any increased force to the lower lumbar region of the spine.

10279: Alfred Henry Carter, Sep. 14, 1895, Great Britain: This prior art is merely another version of those previous stated harness contraptions that utilize a saddle connection creating intolerable friction points across the back while directing dangerous force vectors to the lower lumbar region of the spine.

12436: John Richard Hudson, Feb. 12, 1889, Great Britain: prior art utilizes a harness contraption attached to the saddle and produces the same unacceptable results as those mentioned above.

482271: George Openshaw & Charles Albert Carr, Sep. 6, 1892, Great Britain: Prior art is another variation of a harness contraption with only a forward connection. Disadvantages of this type of contraption forces a cyclist to lean forward in attempting to generate a greater force upon the pedals thereby increasing the force vectors converging at the lower lumbar region of the spine.

234246: Frederick Charles Tipper, May 28, 1925, Great Britain: This prior art is also another version of a harness contraption attached to a saddle with no front attachment thereby creating an increased source of friction on the back of the cyclist. This harness also directs a severe stress to the lower lumbar region of the back as the cyclist leans into the harness in order to exert a greater force upon the pedals.

23722: George Wishart & Alexander Jeffrey, Oct. 10, 1895, Great Britain: This is another harness contraption with a connection only in the front of the cyclist. The effort of the cyclist to exert additional force on the pedals makes him lean forward and in so doing, he places an inordinate amount of stress upon his lower lumbar region of his spine.

410538: Edoardo Pertusato, Apr. 16, 1945, Italy: This prior art is another variation of a harness contraption connected to the rear of the saddle and to a point forward of the top tube. The difficulties with this prior art is evident in that it produces intolerable friction points across the back and directs increased force vectors to the spine.

DETAILED DISCUSSION

Patent #796482

Disadvantges of the Bertrand Patent #796482, France, January 1936 are that all claims are specifically predicated upon utilizing a normal bicycle with the cyclist in the usual position. Due to the prior art's claims that it can produce increased force without additional fatigue while specifically applicable to a normal bicycle with the cyclist in a usual position is not practical and results claimed are impossible to achieve.

As the reader can see in viewing FIG. 1 of the Bertrand art, the usual position of the cyclist, is a bent-over position, directing the force not directly from the legs to a point of resistance at the shoulders and thence in an equal and opposite direction to the pedals, but initially to the lower lumbar region of the back. Whatever force is not dissipated by the stress vectors clashing at the lower back is then translated to the shoulders where any reaction is redirected, not directly to the pedals but once again to the lower lumbar region, resulting in a further dissipation of force, before any residual force can be directed to the pedals. As the force vectors clash at the lower back, stress increases and eventually curtails, rather than increases, the distance, speed and time a cyclist can travel comfortably with less fatigue.

Bertrand claims, "* * * This invention, in its general nature, provides a cyclist in the usual position and on a normal bicycle with a restraint point either on top of his shoulders or on his back or in both regions * * *"

By its own admission, Bertrand prior art does not claim to implement Newton's Law that states, "For every action, there is an equal and opposite reaction." Bertrand directs his forces first to the lower back and thence to the shoulders and thence redirected again through the lumbar region and then to the pedals creating stress factors along the way.

Bertrand's invention specifically directs all generated force to the lower back area where the forces clash causing excessive strain at that point. The present invention specifically claims that no force vectors are directed to the lower lumbar region of the spine but directly from the legs to a point of resistance established by a harness apparatus at the waist, upper body or shoulders and thence translated in an equal and opposite direction to the pedals.

The Bertrand art also introduces a clumsy harness contraption requiring the assembling of cumbersome and time-consuming rear connections which must be attached by two pair of legs mounted to the rear axle with spacers and all parts held together by nuts and bolts. In the present one-piece extended bicycle frame invention, there are no parts to be assembled.

It is also noteworthy that the Bertrand art, introduced more than a half-century ago, has achieved no commercial success whatever.

OBJECTS AND ADVANTAGES

The present Extended Bicycle Frame in Combination with a Harness Apparatus invention provides a solution to a problem that has eluded prior art ever since the inception of the bicycle more than a century ago: that is, how a cyclist can generate his maximum force, over and above the weight of a cyclist's body and the strength of his arms, elbows, wrists and hands upon the handlebars, to a point of resistance and thence directly translate that force in an equal and opposite direction to the pedals.

Accordingly, several objects and advantages of my invention are;

a. In contrast to prior art, the efficient implementation of Newton's Law of Physics, "For every action, there is an equal and opposite reaction." is the theoretical basis of the present invention.

b. Differentiating from previous art, the present invention utilizes an abnormal extended bicycle frame in combination with a harness apparatus to provide a cyclist the means to position himself in such a manner as to exert a maximum force through his legs to a point of resistance established by a harness apparatus at the waist, shoulders or upper body and thence translate that force in an equal and opposite direction to the pedals, with a minimum of effort and optimum ease of operation.

c. The present invention, contrary to the prior art, directs all force vectors produced by a cyclist in a straight line directly from the legs to a point of resistance established by a harness apparatus at the waist, shoulders or upper body, whereby a cyclist's maximum force is then translated directly in an equal and opposite direction to the pedals. In the present invention, there are no dangerous force vectors clashing at the lower lumbar region of the spine as in prior art.

d. Furthermore, the present invention, conversely to prior art, does not depend upon the strength of a cyclist's arms, elbows, wrists and hands upon the handlebar. A cyclist, on the present invention, can exert his maximum force from his legs in a direct line to a point of resistance established by a harness apparatus at the waist, shoulders or upper body. That force is then translated in an equal and opposite direction, also in a straight line, directly to the pedals. There are no dangerous or tiring force vectors clashing at the arms, elbows, wrists and hands as in prior art.

e. All force generated by a cyclist on the abnormal present invention while in an unusual operating position is directed to a point of resistance established by a harness apparatus at the waist, shoulders or upper body and thence translated directly in an equal and opposite direction to the pedals without any loss of efficiency or harmful force vectors clashing at the lower lumbar region, thereby producing greater speed over longer distances with less fatigue.

Further Objects and Advantages of my invention will become apparent from a consideration of the drawings and ensuing description.

BRIEF DESCRIPTION OF DRAWING FIGURES

FIG. 1 is a side view of a normal prior art bicycle with a cyclist in the usual position of legs perpendicular to the ground and upper torso more or less horizontal to the riding surface.

FIG. 2 shows a side view of the present extended bicycle frame invention with a cyclist in one of various positions with a harness apparatus securing cyclist to bicycle and establishing a point of resistance at shoulders (variations of harness apparati may establish other points of resistance on the body, such as the waist or upper body) as well as the rearward extended top tube extending at an angle or directly rearward from a forward top tube at the seat post to a rear down fork extension culminating at a rear axle. Also shown are male and female harness connectors with lockset, an optional enlarged sprocket and an elevational/rotational handlebar.

DRAWING REFERENCE NUMERALS WORKSHEET

Figure 1:
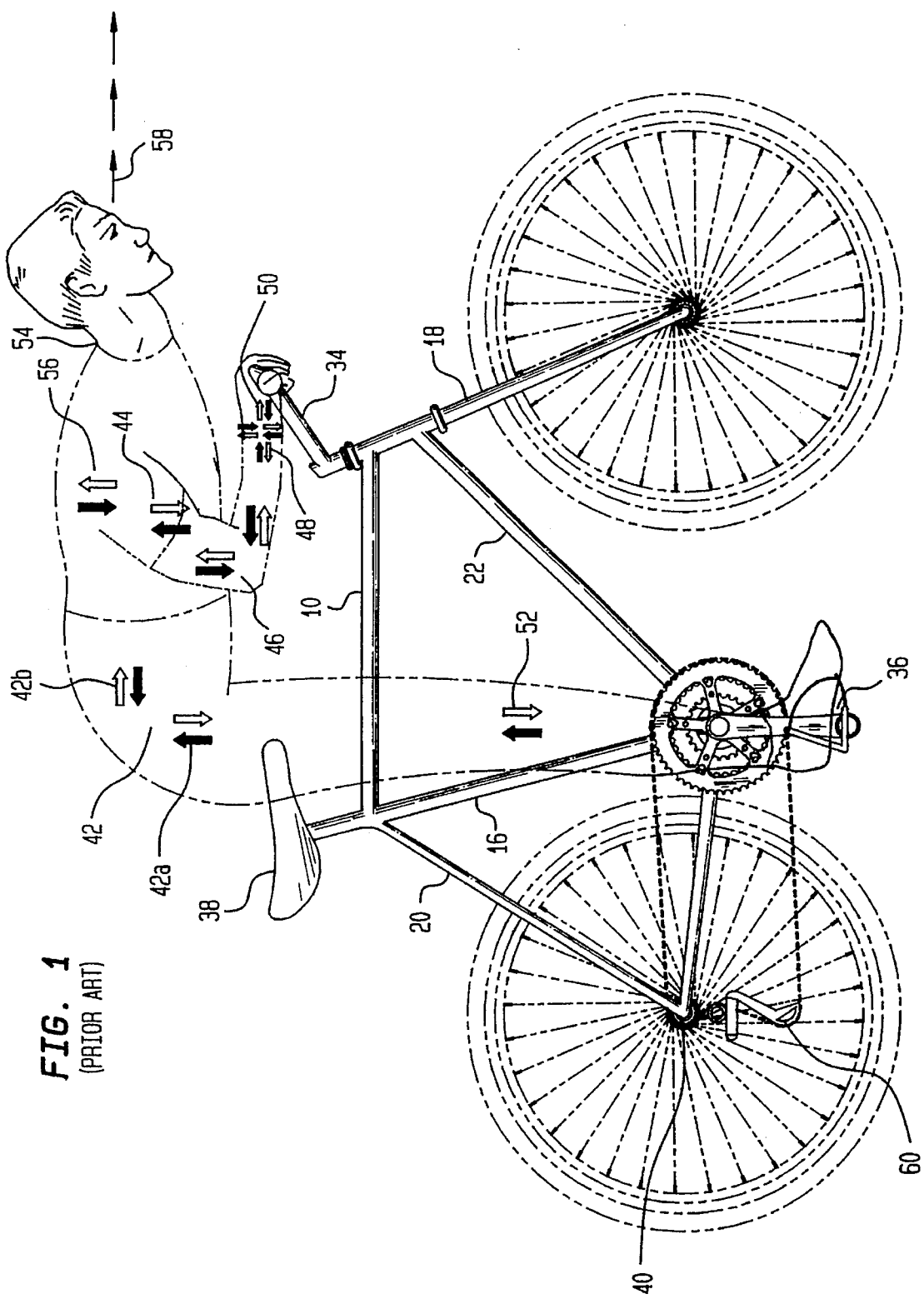

10 Forward Top Tube
12 Rear Top Tube
14 Rear Fork
16 Seat Post
18 Front Fork
20 Middle Fork
22 Forward Down Tube
24 Cycle Harness Connectors (Female)
26 Harness Connectors (Male)
28 Cycle Harness Connector Locksets
30 Harness Straps
32 Harness Shoulder Point of Resistance
34 Handlebar
36 Pedals
38 Saddle
40 Rear Axle
42 Lumbar Area
42a Force Vectors at Lower Back to and from Shoulder
42b Force Vectors at Lower Back to and from Legs
44 Force Vectors at Arms
46 Force Vectors at Elbows
48 Force Vectors at Wrists
50 Force Vectors at Hands
52 Force Vectors at Legs
54 Neck Stress Point
56 Force Vectors at Shoulders
58 Sight Line
60 Deraileur
62 Harness Apparatus
100 Connector Detail

SUMMARY

The present Extended Bicycle Frame in Combination with a Harness Apparatus invention satisfies and solves the above-described needs of previous art by providing a cyclist with the means to exert a maximum force from his legs to a point of resistance created by a harness apparatus at the shoulders, waist or upper body and thence to translate that force in an equal and opposite direction to the pedals resulting in greater speed over longer distances with less fatigue.

DETAILED DESCRIPTION

The following describes in detail one embodiment of the invention and several variations on that embodiment. This discussion, however, should not be construed as limiting the invention to those particular embodiments such as a shoulder harness when various harness apparati can establish a point of resistance not only at the shoulders but at the waist or upper body. Practitioners skilled in the art will recognize numerous other embodiments as well. For a definition of the complete scope of the invention, the reader is directed to the appended claims.

In the drawings, like reference numerals refer to like parts throughout the several views, wherein:

Referring to the drawings, FIG. 1 shows a side view of a normal prior art bicycle with a cyclist in a usual position with legs perpendicular to the ground and upper torso more or less horizontal to the riding surface. Dark arrows represent action force vectors and open arrows represent reaction force vectors. The drawing further shows force vectors 52 generated by the legs of the cyclist directed to and from the lumbar area 42 with force vectors to and from the legs 42a. In addition, force vectors 42b are indicated to and from the shoulders 56 also meeting at the lumbar area. Stress points are also indicated at shoulders 56, arms 44, elbows 46, wrists 48 and hands 50. A stress point is also indicated at the neck 54 as cyclist must lift his head to confirm sight line 58.

Figure 8:
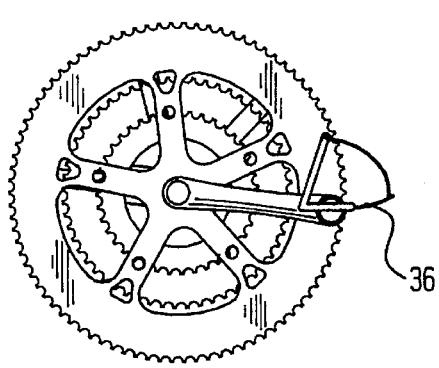
FIG. 8 shows a side view of an enlarged abnormal sprocket.

The parts of a previous art normal bicycle are indicated by a handlebar 34, a front fork 18, a forward down tube 22, a forward top tube 10, a saddle 38, a seat post 16, a rear fork 20, an axle 40, sprocket FIG. 8 and a deraileur 60.

Figure 2:
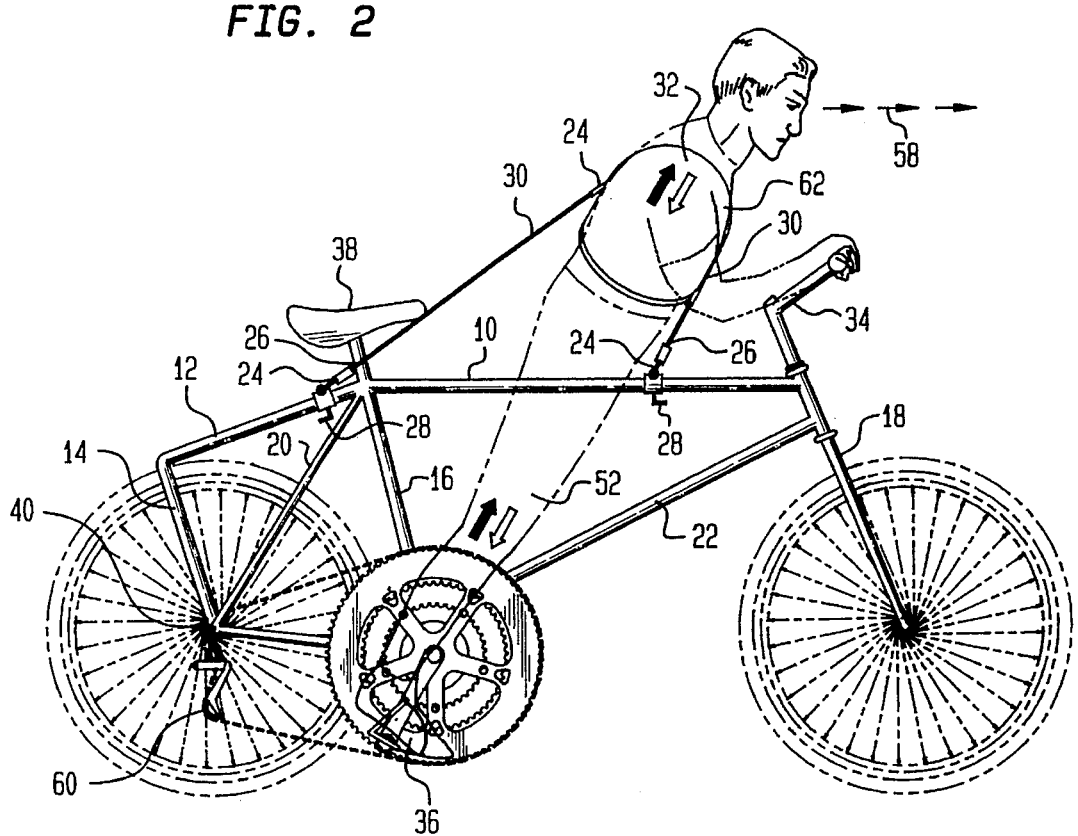

FIG. 2 shows a side view of a cyclist on the present extended bicycle frame in combination with a harness apparatus invention. Said cyclist can exert through his legs 52 a maximum force, over and above said cyclist's weight and arm strength, to a point of resistance established by a harness apparatus at the waist, shoulders or upper body 32 and thence translate that force in an equal and opposite direction to the pedals 36. Said dark arrows indicate action force vectors and open arrows indicate reaction force vectors. A rear top tube 12 extending at an angle or directly rearward from said forward top tube 10 from a point at said seat post 16, to a rear down fork extension 14 culminating at said rear axle 40. Said cyclist is secured in position by a said harness apparatus 62 with spring-tensioned male connectors 26 attached in front and back by straps 30 of said harness apparatus 62. Attached to said forward top tube 10 and said rearward top tube 12 are movable female harness connections 24 with locksets 28 connecting in combination with said male harness connectors 26 attached to a version of harness apparatus 62 to secure said cyclist in various positions to provide a point of resistance at the waist, shoulders or upper body 32 permitting said cyclist to exert a maximum force from his legs 52 to said point of resistance 32 and thence translate said force in a direct line to the pedals 36. An elevational/rotational handlebar 34 is adaptable to various positions for steerage, comfort, resting of the hands and unimpeded sight line 58 resulting in little or no stress at the neck.

In said present invention, increased force translated directly to said pedals (36) provides said cyclist with option of utilizing a larger sprocket FIG. 8 in which to generate even greater speed with less effort.

Said forward top tube 10 and said forward down tube 22 can be extended/reduced to custom fit the present invention to the size, weight and strength of any cylist.

Figure 3:
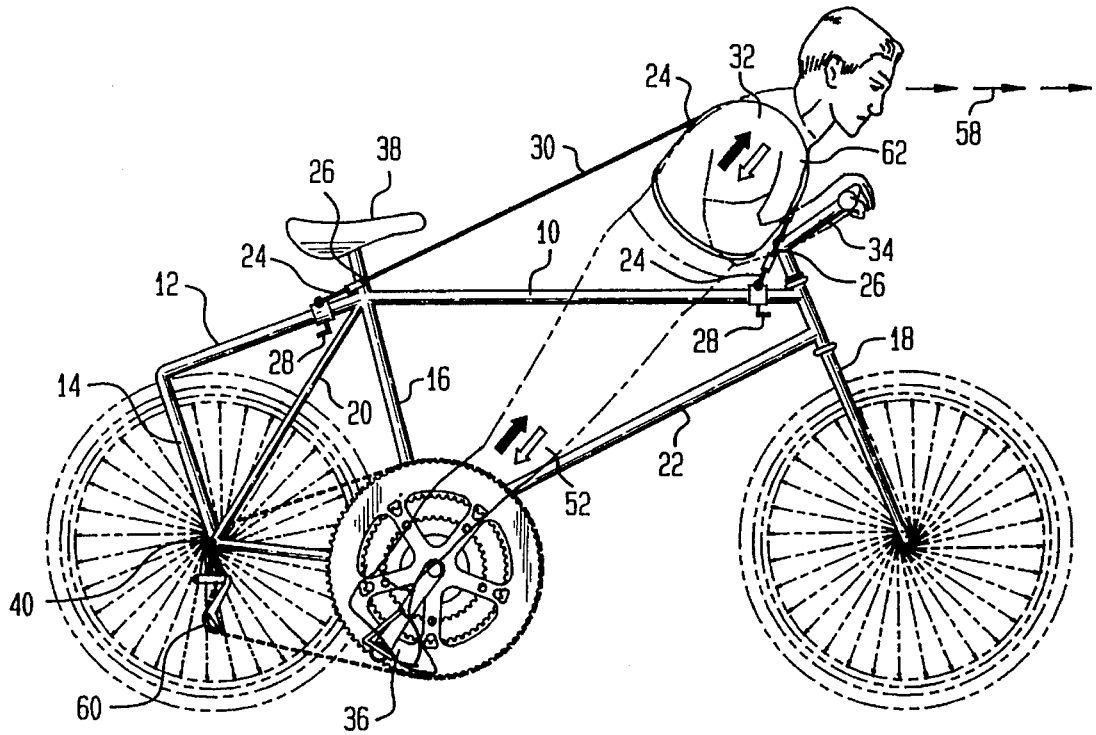
FIG. 3 shows a side view of another variation of the present extended bicycle frame invention with a cyclist in one of several positions adaptable to FIG. 2.

FIG. 3, in combination with parts shown in FIG. 2, shows a side view of said present invention with said harness apparatus 62, said straps 30, said male 26 and said female 24 connectors, said elevational/rotational handlebar 34 and said enlarged sprocket FIG. 8 with said cyclist in a leaning position further forward providing cyclist with the means to generate a maximum force to a point of resistance established by the harness apparatus at waist, shoulders or upper body 32 and thence to translate that force in an equal and opposite direction to the pedals while maintaining an unimpeded sight line 58.

Figure 4:
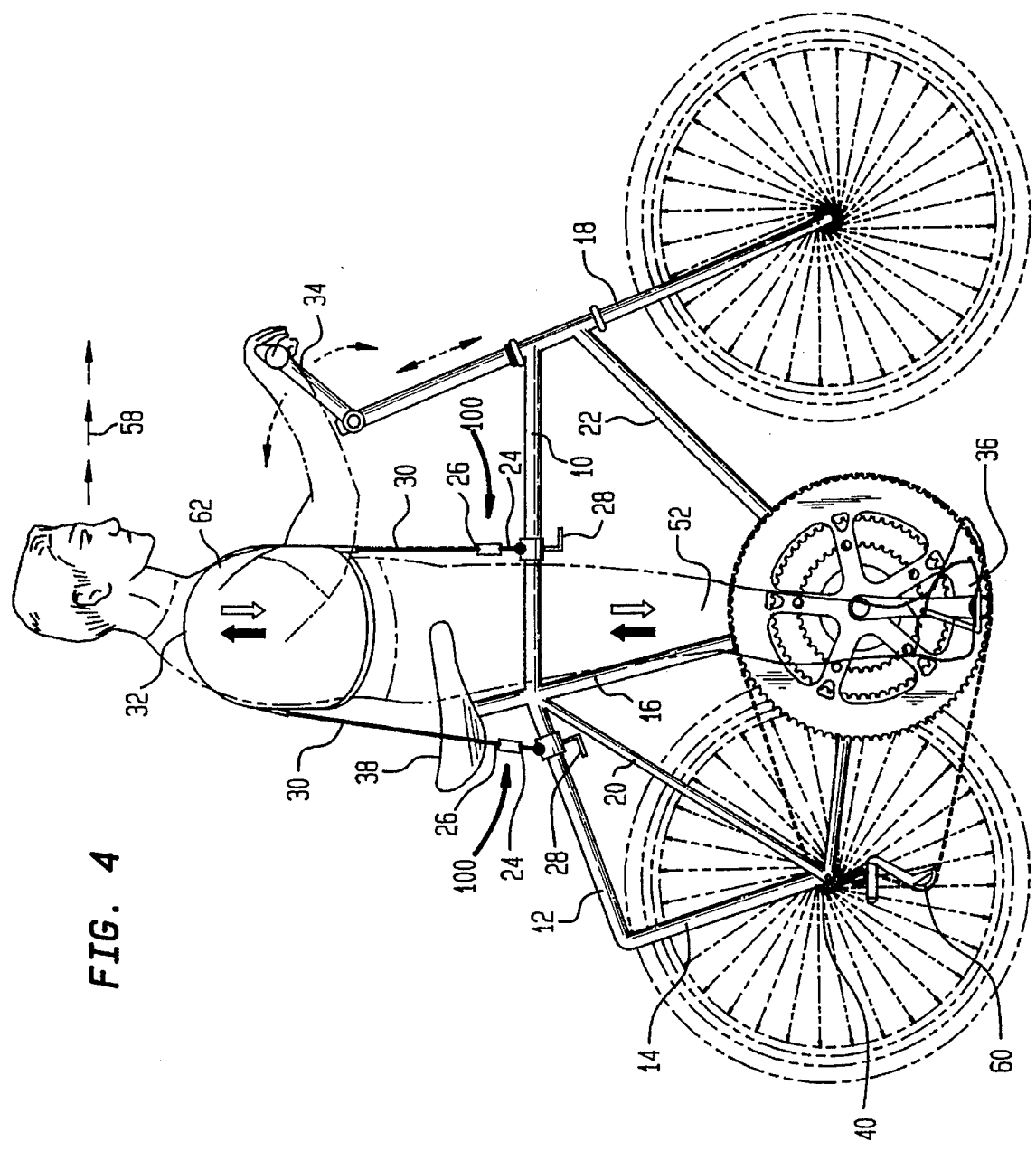
FIG. 4 shows a side view of a further variation of the present extended bicycle frame in combination with a harness apparatus invention with cyclist in one of several positions utilizing elevational/rotational handlebar adaptable to FIG. 2 and FIG. 3.

FIG. 4, in combination with parts shown in FIG. 2 and FIG. 3, shows a side view of said present invention including said harness apparatus 62, said straps 30, said male 26 and said female 24 connectors, said elevational/rotational handlebar 34 and said enlarged sprocket FIG. 8 which provides the means for said cyclist to generate a maximum force to a point of resistance established by harness apparatus at the waist, shoulders or upper body 32 and thence to directly translate said maximum force in an equal but opposite direction to said pedals 36 while comfortably cycling in a 'walking' or 'strolling' position.

Figure 5:
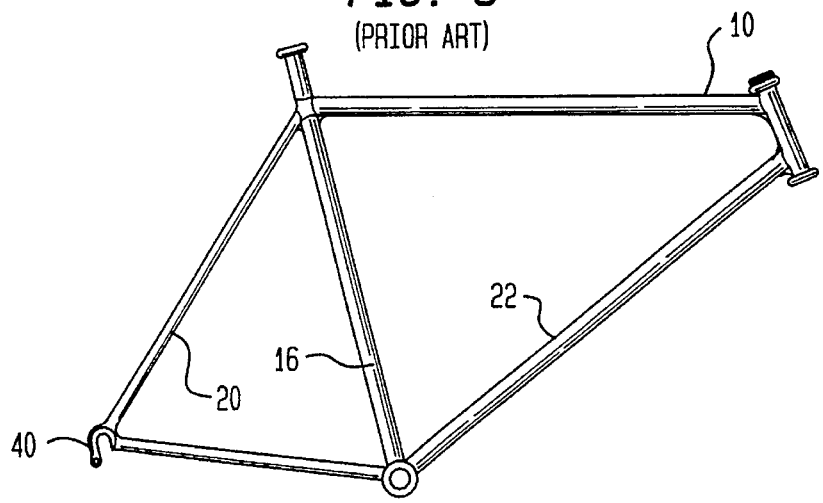
FIG. 5 shows a side view of a normal bicycle frame.

FIG. 5, in combination with parts shown in FIG. 1, shows a side view of said normal prior art bicycle frame.

Figure 6:
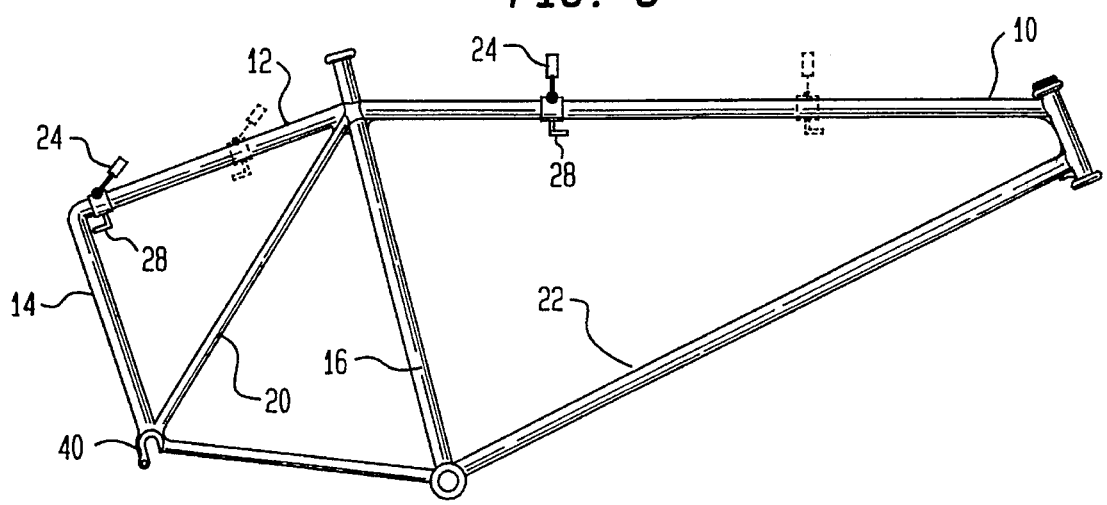
FIG. 6 shows a side view of the present extended bicycle frame invention with movable harness connectors.

FIG. 6, in combination with parts shown in FIG. 2, FIG. 3 and FIG. 4, shows a side view of said present invention depicting said extended bicycle frame, with said rear top tube 12 extended rearward at an angle or directly rearward from forward top tube 10 from intersection of said seat post 16 to said downward extended rear fork 14 culminating at rear axle 40, a middle down tube 20 also designated as a rear fork in a normal bicycle and said forward down tube 22 along with said movable male harness connectors 26 with locksets 28.

Figure 7:
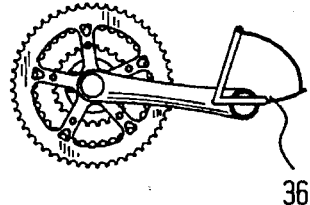
FIG. 7 shows a side view of a normal prior art sprocket utilized on said normal prior art bicycle FIG. 1.

FIG. 7 shows a side view of normal-sized sprocket utilized on said normal bicycle as shown in FIG. 1.

FIG. 8 shows a side view of said optional enlarged sprocket that can be utilized on said present invention as shown in FIG. 2, FIG. 3 and FIG. 4.

Figure 9:
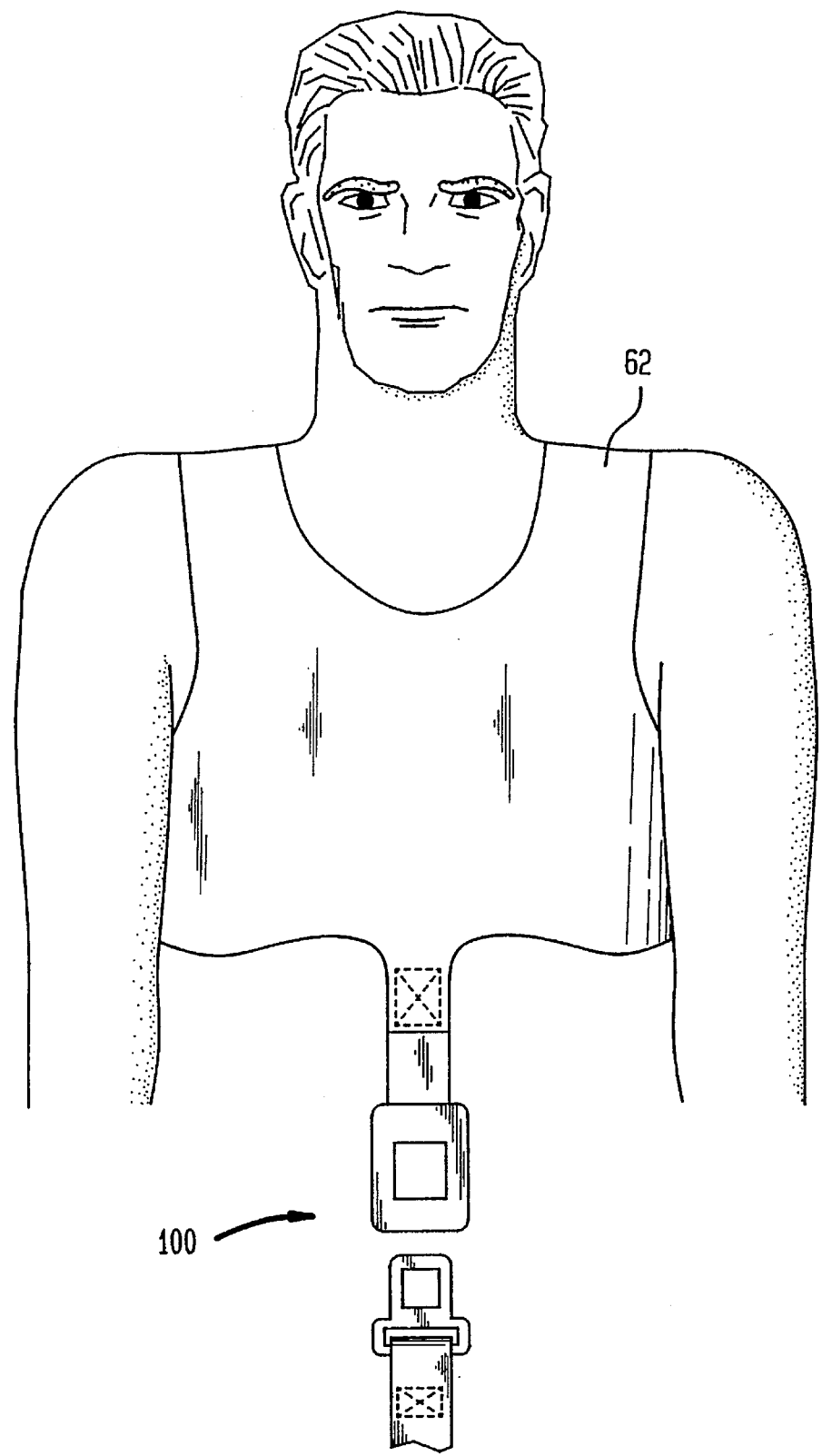
FIG. 9 shows a front view of a shoulder harness, one of various harness apparati designs, with typical front and rear male and female connectors.

FIG. 9 shows a shoulder version of said harness (apparatus applicable to waist and upper body points of resistance, as well) 62 with detail view 100 of said male 26 and female 26 connectors attached to said spring-tensioned harness straps 30.

It is understood that many variations in size, shape and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only by the following claim or claims interpreted according to accepted doctrines of claim interpretation, including the doctrine of equivalence and reversal of parts.

Since there is no loss in efficiency, the synergism between the harness apparatus and the extended frame of the present invention, produces greater ease of operation allowing the cyclist to pedal longer, faster and at greater distances than any other bicycle.

While my above description contains many specificities, these should not be construed as limitations on the scope of the invention, but rather as an exemplification of one preferred embodiment thereof. Many other variations are possible. For example, the harness apparatus can be converted from establishing a point of resistance at the shoulder to one that can establish a point of resistance at the waist or the upper body as well.

What is claimed is:

1. A single-piece extended bicycle frame in combination with a movable harness apparatus wherein the improvement comprises, a. an extended rearward top tube, b. said extended rearward top tube connected to an extended rear down fork culminating at the rear axle, c. a harness apparatus attached to movable connectors on said extended rear top tube and a forward top tube, d. said movable harness connectors on said rear and forward top tubes securable by a lockset.

2. The single-piece extended bicycle frame in combination with a harness apparatus of claim 1, further comprising an enlarged sprocket rotatably mounted to said bicycle frame.

3. The single-piece extended bicycle frame in combination with a harness apparatus of claim 1, further comprising a rotationally and elevationally adjustable handlebar mounted to said bicycle frame providing a means to adjust said handlebar to various positions facilitating steering and ease of operation.

4. A single-piece extended bicycle frame in combination with a harness apparatus comprising:

said single-piece bicycle frame including a forward top tube, a forward down tube, a seat post connected to said forward top tube and forward down tube, a middle fork connected to the seat post, a rear axle connected to the middle fork, a rear top tube connected to said seat post, and a rear fork connected between said rear top tube and said rear axle, a forward cycle harness connector attached to said forward top tube so as to allow translating forward and rearward movement and including a lockset, a rear cycle harness connector attached to said rear top tube so as to allow translating forward and rearward movement and including said lockset, and a harness apparatus removably connected to said forward cycle harness connector and said rear cycle harness connector.

\* \* \* \* \*